(12) United States Patent
Song et al.

(10) Patent No.: US 7,542,514 B2
(45) Date of Patent: Jun. 2, 2009

(54) METHOD AND DEVICE FOR ADAPTIVE MODULATION AND CODING BASED ON SECOND ORDER STATISTICS OF CHANNEL INFORMATION

(75) Inventors: Pengpeng Song, Shanghai (CN); Liyu Cai, Shanghai (CN); Yan Wan, Shanghai (CN)

(73) Assignee: ALCATEL, Paris (FR)

( * ) Notice: Subject to any disclaimer, the term of this patent is extended or adjusted under 35 U.S.C. 154(b) by 657 days.

(21) Appl. No.: 10/875,689

(22) Filed: Jun. 25, 2004

(65) Prior Publication Data
US 2004/0264588 A1    Dec. 30, 2004

(30) Foreign Application Priority Data
Jun. 27, 2003    (CN) .................... 03 1 29575

(51) Int. Cl.
*H04K 1/10* (2006.01)
(52) U.S. Cl. ............... 375/260; 375/267; 375/296; 375/221; 375/222; 375/219; 375/220; 375/285; 375/295; 375/316; 375/346
(58) Field of Classification Search .......... 375/219, 375/221, 260, 285, 296, 222, 267
See application file for complete search history.

(56) References Cited
U.S. PATENT DOCUMENTS
6,167,031 A    12/2000 Thielecke
6,751,187 B2*  6/2004 Walton et al. .............. 370/210
7,012,883 B2*  3/2006 Jalali et al. ................ 370/208
7,020,073 B2*  3/2006 Kadous et al. ............. 370/208
2002/0101943 A1  8/2002 Proctor
2002/0163983 A1* 11/2002 Redferm ..................... 375/350
2003/0086371 A1  5/2003 Howard
2004/0184398 A1*  9/2004 Walton et al. .............. 370/203
2005/0003831 A1*  1/2005 Anderson ................. 455/456.1
2005/0101272 A1*  5/2005 Rowitch et al. .......... 455/161.2
2005/0245197 A1* 11/2005 Kadous et al. ........... 455/67.13

FOREIGN PATENT DOCUMENTS
WO    WO 0225853 A2    3/2002

* cited by examiner

Primary Examiner—Chieh M Fan
Assistant Examiner—Siu M Lee
(74) Attorney, Agent, or Firm—Sughrue Mion, PLLC

(57) ABSTRACT

The present invention discloses a method and device for adaptive modulation and coding based on second order statistics of channel information in OFDM system, characterized in that, by means of variance of Signal-to-Noise ratio (SNR) an appropriate adaptation time window is selected dynamically to trace time-varying channel better; and in that a decision criterion of second order, namely selecting an appropriate modulation and coding schemes (MCS) according to average value of SNR and variance of SNR, is employed to obtain accurate mapping from SNR to MCS. The mapping enhances practicability of the adaptive modulation and coding, decreases probability of system outage, and thus results in better performance of bit error rate.

10 Claims, 3 Drawing Sheets

METHOD AND DEVICE FOR ADAPTIVE MODULATION AND CODING BASED ON SECOND ORDER STATISTICS OF CHANNEL INFORMATION

CROSS-REFERENCE TO RELATED APPLICATION(S)

This application is based on the Chinese Patent Application No. 03129575.4 filed on Jun. 27, 2003, the disclosure of which is hereby incorporated by reference thereto in its entirety, and the priority of which is hereby claimed under 35 U.S.C. §119.

FIELD OF THE INVENTION

The present invention relates to a method and device for adaptive modulation and coding in wireless OFDM system, and more particularly, to a method and device for adaptive modulation and coding based on second order statistics of channel information.

BACKGROUND OF THE INVENTION

Usually link adaptation technology uses the received Signal-to-Noise Ratio (SNR) as the channel quality information (CQI) in OFDM systems. Therefore, adaptive modulation and coding can be performed on the basis of different SNR ranges. Within each adaptation time window T for adaptive modulation and coding (AMC) scheme, the received SNR may be located in any one of the pre-defined SNR grids (as shown in FIG. 1). γ represents the average value of SNR at the receiver and M represents the related modulation and coding scheme. For example, if the received SNR value γ is within a range of γ1 to γ2, then modulation and coding scheme M1 will be adopted. This method is also referred to as "threshold method". In addition, there are also other methods using bit error ratio (BER)/package error ratio (PER) for CQI in link adaptation. In this way, the receiver will calculate the BER/PER, instead of SNR, of each frame/block transmission. The related process is exactly the same as above.

Conventional threshold method can work well under slow time-varying channels like wireless indoor environment. Since the channel fading tends to be flat and slow varying, a fixed adaptation window will satisfy the requirements for tracking the slow-varying channel. For wireless local area network (WLAN) systems, the wireless indoor environments are often flat, slow-varying channels in an update period T, which is easy to process and equalize.

But in fast time-varying environments, e.g. where the receiver is moving at a high speed outside, the conventional method may not be able to track the fast-fading channel with the pre-defined update period T. That is, the update period T is relatively large and the current CQI may be invalid for the next transmission with practical feedback delay. In this case, channel prediction or other methods should be used to solve fast time-varying channel and large feedback delay.

Another problem exists even if the update period T is appropriate. The conventional method usually uses the average SNR of a received signal within time T to determine a modulation and coding scheme (MCS) that is supposed to match the varying channel well. However, the average SNR may not describe the features of the fading channel well enough. Via multi-path channel, it is popular for the received signal to experience deep channel fading, or "slopes", within the time window T. These "slopes", compared with flat-fading envelopes, are more possible to incur bit errors with the determined MCS. In the time length on which "slopes" occurred, the determined MCS may not perform as well as expected and system outage will probably occur. Simulation results have proved that MCS selection based on average SNR cannot give the optimal link adaptation.

As shown in FIG. 2, Rayleigh fading is often used to represent a received signal envelope in wireless systems. This envelope tends to contain a plurality of discontinuous "slopes" within a large-scaled time window T. However, if we observe the received SNR, we will find that the development trace of the SNR envelope tracks the amplitude of the signal, but tends to be easily formed within an identical time window (shown in FIG. 3).

Such a case also applies to sub-carriers of single-carrier systems and multi-carrier systems. However, if we choose to observe SNR curves over a time no larger than channel coherence time within the time window T, the SNR envelope then tends to be flat (shown in FIG. 4).

Assuming that the channel quality indicator (here, we use SNR) is measured over an arbitrary time window (no larger than channel coherence time) set by the link adaptation protocol. In multi-carrier modulation system, a two-dimensional time-frequency window may be used. Theoretically, the mapping from SNR information to MCS should be determined by the probability density function (pdf) of the SNR over that period. However, in real channels the pdf cannot be obtained by simple analysis since it is in fact a function of quite a few parameters. Typically, for single-carrier systems, pdf depends on the channel fading statistics over the adaptation window, but it also depends on the relationship between the length of the window in time and the channel coherence time. For wireless OFDM systems, it also depends on the relationship between the length of the adaptation window in frequency and the channel coherence frequency bandwidth.

In order to estimate the pdf accurately, we simplify the problem by estimating limited statistical information from the pdf, such as the k-order moment over the adaptation window. The k-order moments are useful when k is equal to 2 and yet yield sufficient information for a reasonably accurate mapping of the SNR into MCS information. Here, we recommend using the second order moment of the SNR (the SNR variance). The average SNR used in the conventional method is only the pure mean (first order moment) and gives how much power is measured at the receiver on average. The second order moment (variance) of the SNR over the time/frequency dimension captures the useful information on the time/frequency selectivity of the channel within the adaptation window. The larger the variance, the stronger the fading selectivity on time/frequency dimension is. Therefore, if the current variance is relatively large, it is beneficial to shrink the adaptation window such that the channel fading pdf tends to be flat and results in a smaller variance. The SNR variance on frequency can be used to measure the suitable size of sub-group in adaptive OFDM system. The modification on the adaptation period T can improve the effectiveness and accuracy of the mapping from SNR to MCS in the given time window, but may need the cooperation of Link Adaptation (LA) protocol to signal the update of adaptation period T.

The conventional method uses the SNR grids as shown in FIG. 1 to determine which MCS to be adopted for next transmission. In the solution proposed here, the average value of SNR and the variance of SNR will contribute to the MCS selection in link adaptation.

SUMMARY OF THE INVENTION

The purpose of the present invention is to benefit link adaptation by dynamically selecting a suitable adaptation time window and using a second-order decision criterion to select the appropriate modulation and coding scheme (MCS).

The present invention is realized as follows:

A method for adaptive modulation and coding based on second order statistics of channel information in orthogonal frequency divisional multiplexing (OFDM) systems, said method comprises following steps:

a) a mobile station determining the largest among a set of adaptation time windows $T_1, T_2, \ldots T_n$ as a current adaptation time window;

b) said mobile station receiving a set of pilot signals from a base station in the current adaptation time window, obtaining Signal-to-Noise ratio (SNR) samples based on the pilot signals, calculating variance of the SNR ($\beta$) and average value of the SNR ($\gamma$);

c) comparing said variance of SNR ($\beta$) in step b) with threshold values $\beta 0$, $\beta k$, obtaining final current adaptation time window and current modulation and coding scheme according to the results from comparison and said average value of SNR ($\gamma$);

d) feeding the related information of the final current adaptation time window and the current modulation and coding scheme, which are obtained in step c), back to the base station as parameters for the base station to transmit data next time.

Said step c) comprises the steps of:

e) comparing $\beta$ with $\beta 0$, if $\beta > \beta 0$, then updating the current adaptation time window in step b) to a lower level and returning to step b), otherwise implementing step f);

f) obtaining a current modulation and coding scheme in accordance with the average value $\gamma$ of SNR obtained in step b);

g) comparing $\beta$ with $\beta k$, if $\beta k < \beta < \beta 0$, then updating the current modulation and coding scheme to a lower level, otherwise keeping the current modulation and coding scheme unchanged.

In step a) a set of adaptation time windows $T_1, T_2, \ldots T_n$ corresponding to various moving velocities $v_1, v_2, \ldots v_n$ of the mobile station respectively is obtained by pre-simulating and calculating channel coherence time, said channel coherence time meaning a period of time in which the correlation coefficient of two a received signals is larger than 0.9.

In step c) the threshold value $\beta 0$ and $\beta k$ are obtained in combination with simulation test where a target bit error rate and target throughput are approached, $\beta 0$ being the threshold value for changing adaptation time window, $\beta_k$ being the threshold value for changing modulation and coding scheme, and $\beta 0 > \beta k$, and said target bit error rate and target throughout being determined by wireless communications service.

In step b) the pilot signal is known data from the base station.

A device for adaptive modulation and coding based on second order statistics of channel information in orthogonal frequency divisional multiplexing (OFDM) systems, said device comprising calculation means and comparison-update means which are located in a mobile station, wherein:

a channel estimation means of a mobile station for obtaining a sample average of Signal-to-Noise Ratio (SNR) in accordance with pilot signals received from a base station by the mobile station as the largest among a set of adaptation time windows $T_1, T_2, \ldots T_n$ being the current adaptation time window;

the calculation means for calculating variance of the SNR ($\beta$) and average value of the SNR ($\gamma$) in accordance with the SNR samples obtained by said channel estimation means; and the comparison-update means for comparing the obtained variance of the SNR ($\beta$) with the threshold values $\beta 0$, $\beta k$, then obtaining final current adaptation time window and current modulation and coding scheme according to results from comparison and the average value of SNR ($\gamma$) obtained from the calculation means, the related information of said final current adaptation time window and the current modulation and coding scheme is fed back to said base station as parameters for said base station to transmit data next time.

A set of adaptation time windows $T_1, T_2, \ldots T_n$ corresponding to various moving velocities $v_1, v_2, \ldots v_n$ of the mobile station respectively is obtained by pre-simulating and calculating channel coherence time, said channel coherence time meaning a period of time in which the correlation coefficient of two a received signals is larger than 0.9.

said pilot signal is known data from the base station.

The threshold values $\beta 0$ $\beta k$ are obtained in combination with simulation test where a target bit error rate and target throughput are approached, $\beta 0$ being the threshold value for changing adaptation time window, $\beta_k$ being the threshold value for changing modulation and coding scheme, and $\beta 0 > \beta k$, and said target bit error rate and target throughout being determined by wireless communications service.

The comparison-update means comparing the obtained variance of SNR ($\beta$) with the threshold values $\beta 0$ $\beta k$ and then obtaining final current adaptation time window and current modulation and coding scheme according to results from comparison result and the average value of SNR ($\gamma$), the following steps are implemented: comparing $\beta$ obtained by the calculation means with $\beta 0$, if $\beta > \beta 0$, then updating the current adaptation time window to a lower level; the channel estimation means obtaining Signal-to-Noise Ratio (SNR) samples in accordance with the current adaptation time window; the calculation means calculating variance of the SNR ($\beta$) and average value of the SNR ($\gamma$) in accordance with the SNR, which step being implemented repeatedly until $\beta <= \beta 0$, then obtaining final current adaptation time window; otherwise obtaining current modulation and coding scheme in accordance with the current average value of the SNR ($\gamma$); and comparing $\beta$ with $\beta k$, if $\beta k < \beta < \beta 0$, then updating the current modulation and coding scheme to a lower level, otherwise keeping the current modulation and coding scheme unchanged.

The present invention can track the selective fading of a time domain channel by dynamically selecting the appropriate adaptation time window. Even if the user of a mobile station is moving at a high speed, it can update the current adaptation time window to a lower level by the indicator $\beta 0$, which enables the adaptation time window to track the time-varying channel better.

Moreover, the present invention can get more accurate mapping from SNR to MCS, which will enhance the availability of AMC and decrease the probability of system outage and hence, result in better BER performance.

Additionally, the present invention enables the feedback of CQI information more cater to actual demands. When the mobile station is moving at a low speed, a longer adaptation time window is launched, resulting in a larger time interval of the feedback of the signal information and a smaller capacity of the signal fed back within unit time; when the mobile station is moving at a high speed, a shorter adaptation time window is launched, resulting in a larger capacity of the signal fed back within unit time, which is just requirement for obtaining good system performance when moving at a high speed. In this sense, the present invention provides an on-demand feedback at the same time.

BRIEF DESCRIPTION ON THE DRAWINGS

The accompanying drawings, which are incorporated in and constitute a part of the specification, illustrate embodiments of the invention and, together with the description, server to explain the principles of the invention.

DESCRIPTION OF THE PREFERRED EMBODIMENTS

The preferred embodiments of the present invention will be described in detail in accordance with the accompanying drawings.

Figure 5:
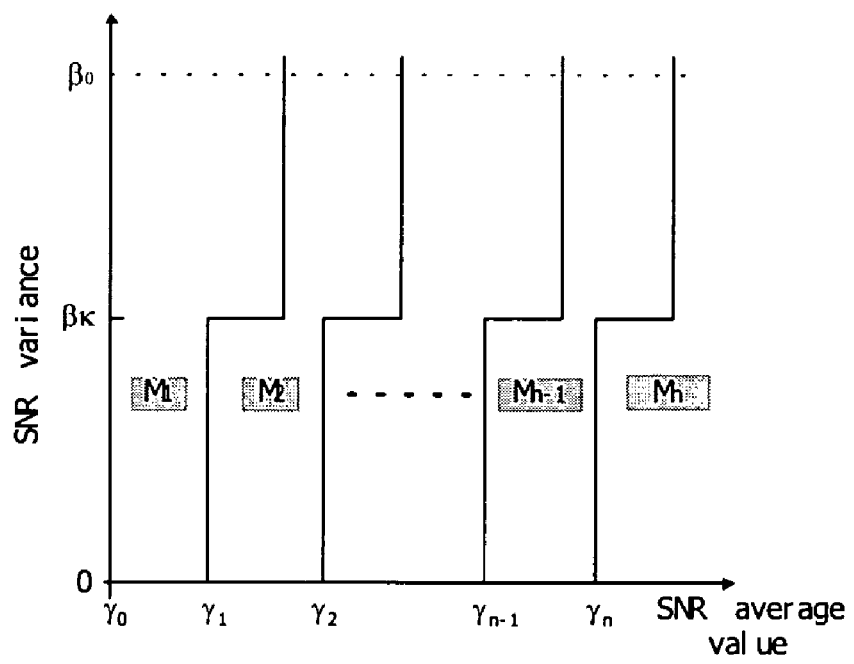
FIG. 5 is a diagram showing a SNR second order decision criterion of the adaptive modulation and coding method in accordance with the present invention.

FIG. 5 is a diagram showing a SNR second order decision criterion of the adaptive modulation and coding method in accordance with the present invention. The decision criterion determines the modulation and coding scheme (MCS) to be adopted in accordance with the average value γ of SNR and the variance β of SNR. For instance, when γ is between γ1 and γ2, then a corresponding modulation and coding scheme M2 is adopted; When 0<β<=βk, the corresponding modulation and coding scheme M2 is adopted, whereas when βk<β<β0, the modulation and coding scheme M1 which is one level lower than the corresponding modulation and coding scheme M2 is adopted.

Figure 6:
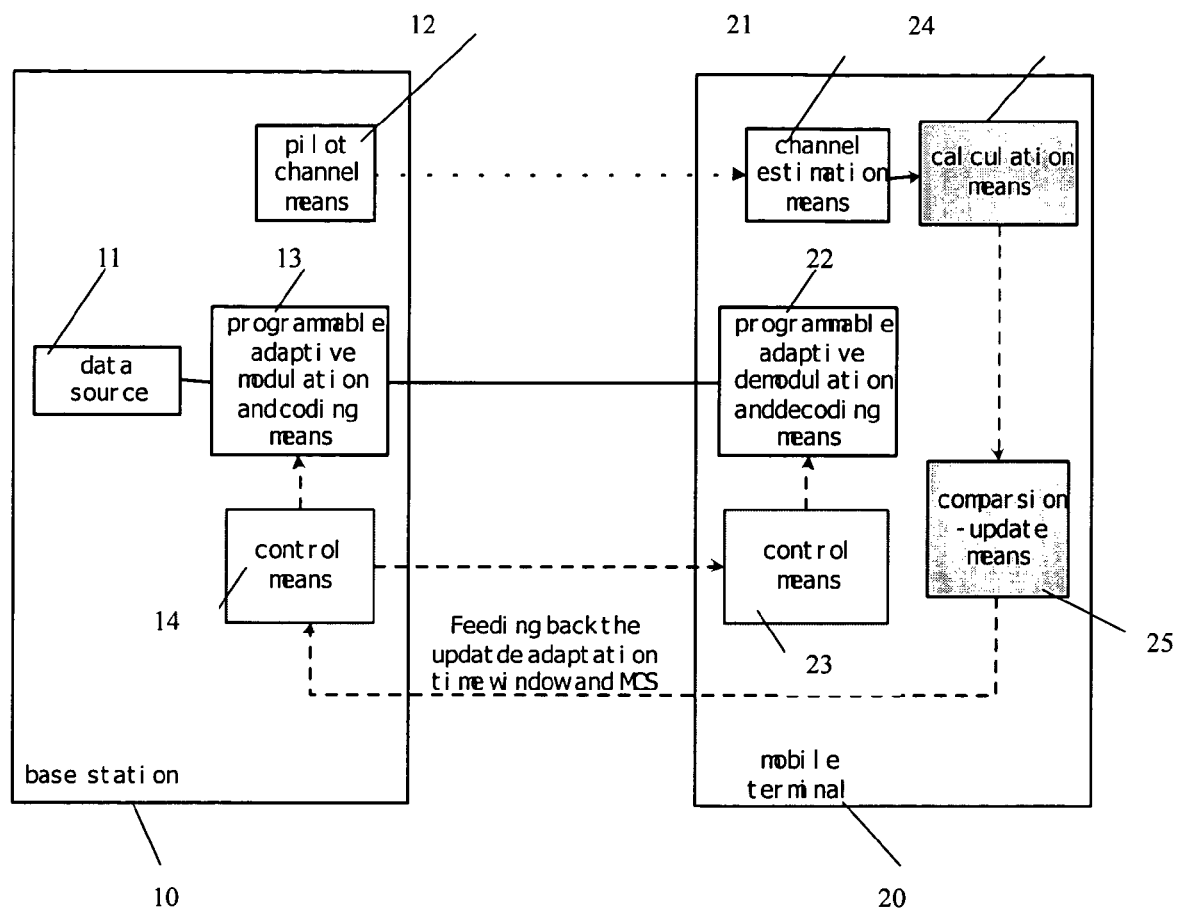
FIG. 6 is a diagram showing the provision of a base station and mobile station carrying out in an OPDM system the adaptive modulation and coding method in accordance with the present invention.

FIG. 6 is a diagram showing the provision of a base station and mobile station carrying out the method for adaptive modulation and coding in OFDM systems in accordance with the present invention, wherein a base station 10 includes a data source 11, a pilot channel means 12, a programmable adaptive modulation and coding means 13, and a control means 14, all of these means are of prior art; and wherein a mobile station 20 relating to the present invention includes a channel estimation means 21, a programmable adaptive demodulation and decoding means 22, and a control means 23, which are of prior art, and also includes a calculation means 24 and a comparison-update means 25 used in carrying out the method for adaptive modulation and coding of the present invention. The steps of the method for adaptive modulation and coding based on second order statistics of channel information in accordance with the present invention are as follows:

a) The mobile station 20 determines the largest among a set of adaptation time windows $T_1, T_2, \ldots T_n$ as a current adaptation time window, wherein the set of adaptation time windows $T_1, T_2, \ldots T_n$ corresponding to various moving velocities $v_1, v_2, \ldots v_n$ of the mobile station 20 respectively are obtained by pre-simulating and calculating channel coherence time. The channel coherence time means a period of time in which the correlation coefficient of two arbitrary received signals is larger than 0.9. The process for calculating the set of adaptation time windows is illustrated as follows:

The known formula for calculating Doppler frequency shift is $$f_d = \frac{v \cdot f_c}{C},$$

wherein v represents the moving speed of the mobile station 20, $f_c$ represents the carrier-frequency of radio frequency, and C represents the propagation speed of light; moreover, the channel coherence time is in an inverse ratio to Doppler frequency shift. Based on the experimental formula $Tc=0.423/f_d$ (wherein $T_c$ represents channel coherence time), when the carrier-frequency $f_c$ is equal to 3.2 GHz, coherence times with respect to the mobile station 20 at speeds of v1=3 km/hour, v2=60 km/hour, v3=120 km/hour are as shown in the following table:

| Speed of mobile station | 3 km/hour | 60 km/hour | 120 km/hour |
|---|---|---|---|
| Coherence time | 47.6 ms | 2.38 ms | 1.2 ms |

Thus, in conjunction with parameters of the real system, corresponding to the three speeds v1, v2, v3 of the mobile station 20 respectively, the adaptation time window in the present invention can be set as the three levels: $T_1=20$ ms, $T_2=2$ ms, $T_3=1$ ms. Hence, the mobile station 20 sets the largest level $T_1=20$ ms as the current adaptation time window in the present embodiment.

b) The mobile station 20 receives a set of pilot signals from the pilot channel means 12 of the base station 10 in the current adaptation time window. The channel estimation means 21 obtains SNR samples based on the pilot signals, and the calculation means 24 calculates variance of the SNR (β) and average value of the SNR (γ) in accordance with the SNR samples.

c) The comparison-updating means 25 of the mobile station 20 compares the obtained variance of SNR (β) with thresholds β0, βk, wherein the threshold values β0 and βk are obtained via simulation test where a target bit error rate and a target throughput are approached, β0 is the threshold value for changing adaptation time window, β, is the threshold value for changing modulation and coding scheme, and β0>βk, and said target bit error rate and target throughput are determined by wireless communications service.

Generally speaking, the fading of a radio channel is in accordance with Rayleigh distribution. Due to moving condition, a radio channel presents a time-selectivity fading. In the present invention, both β0 and βk are measurements of the strength of time-selectivity fading of channel in the physical sense. Therefore, by comparing the threshold parameters β0, βk with the measured variance of SNR (β), the strength of time-selectivity fading of the current channel can be measured and in return, appropriate measures (such as adopting an appropriate time window, and modulation and coding scheme, etc.) can be taken to make up the effect brought about by the selective fading.

Since each of the two parameters is of similar physical sense, they can be obtained via similar simulation.

Here, β0 (the changing threshold value for adaptation time window) is determined first, the selection method thereof is illustrated as follows:

1) Establishing a simulation model of radio transmitting channel (whose fading characteristics are in accordance with the Rayleigh distribution);

2) Transmitting known data of a first frame (whose modulation and coding scheme is pre-determined), measuring respectively the transfer characteristic H of the radio channel at a given speed of a lower velocity speed v1=3 km/h and an upper velocity speed v3=120 km/h, and according to the received data, calculating variance β of SNR of the channel to obtain the value range ($\beta_{down}$, $\beta_{up}$), wherein SNR of the channel is defined as $$channel\_snr = \frac{|H|^2}{No},$$

No is the noise power;

3) Transmitting known data of the first frame (whose modulation and coding scheme is pre-determined), measuring the transfer characteristic H, of the radio channel at a certain moving speed v(v1<v<v3), and calculating average value γ, and variance β, of SNR in accordance with said formula in step 2);

4) In the initial phase, setting β0 as $$\beta_0 = \frac{\beta_{down} + \beta_{up}}{2},$$

starting from the transmission of data of a second frame, obtaining a corresponding modulation and coding scheme (MCS) in accordance with the average value $\gamma_v$ obtained in step 3), for example, obtaining the corresponding modulation and coding scheme modulation and coding scheme (MCS) M2 when $\gamma_1 < \gamma_v < \gamma_2$, calling the set β0 and the simulation parameters of the corresponding modulation and coding scheme, performing simulation operation, and obtaining a BER of the system; if the BER being smaller than the target BER, then setting β0 as β0=β0+Δβ and calling the set β0 and the simulation parameters of the corresponding modulation and coding scheme, performing simulation operation; if the BER being larger than the target BER, then setting β0 as β0=β0−Δβ and calling the set β0 and the simulation parameters of the corresponding modulation and coding scheme until the BER being close to the target BER; for example, the target BER being equal to $10^6$;

Here, β0 may be set from $\beta_{down}$ to $\beta_{up}$ respectively to operate simulation.

Figure 1:
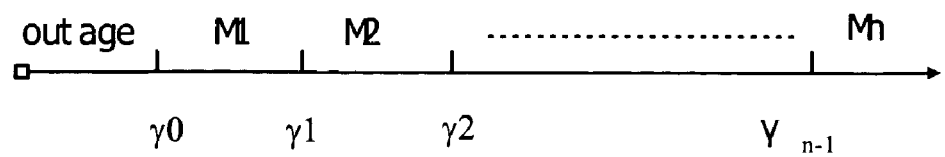
FIG. 1 is a diagram showing SNR grids of a conventional threshold method.
Figure 2:
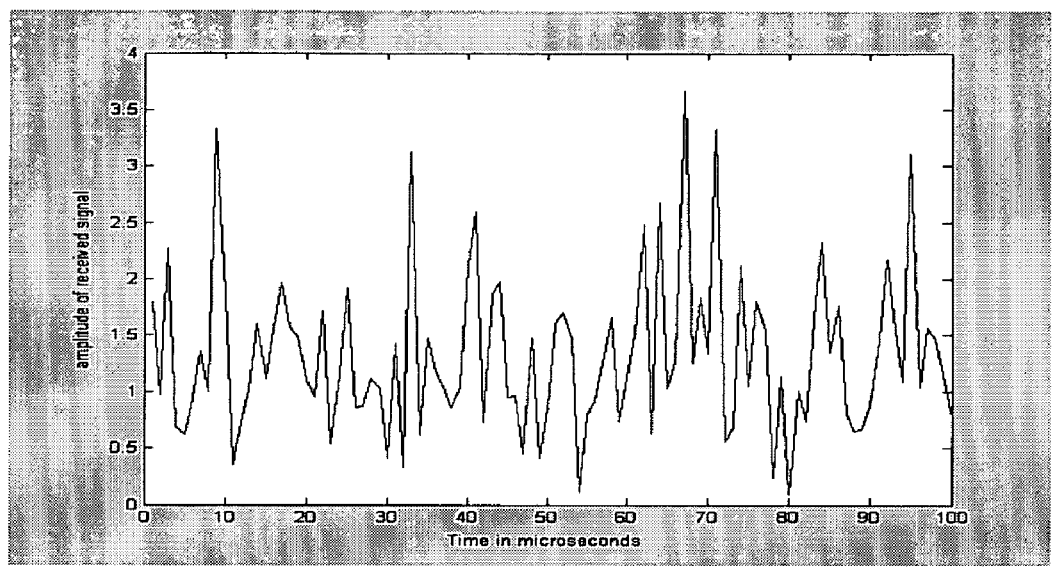
FIG. 2 is a diagram showing a typical Rayleigh fading envelope.
Figure 3:
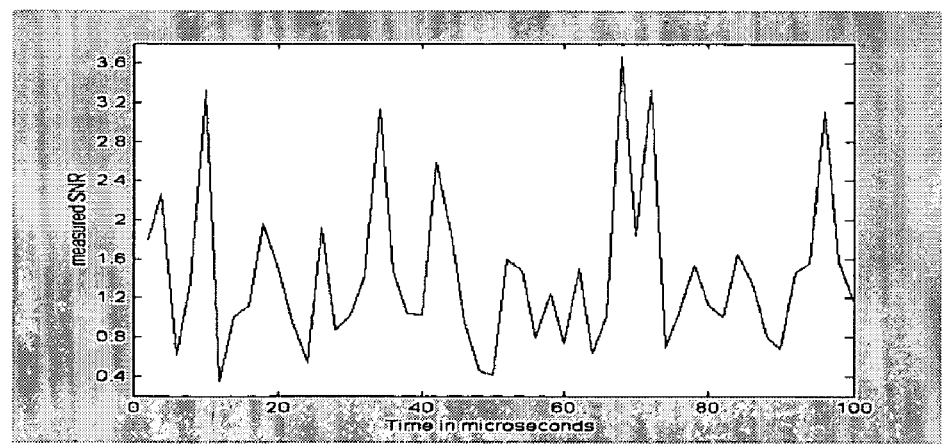
FIG. 3 is a diagram showing a detected SNR envelope.
Figure 4:
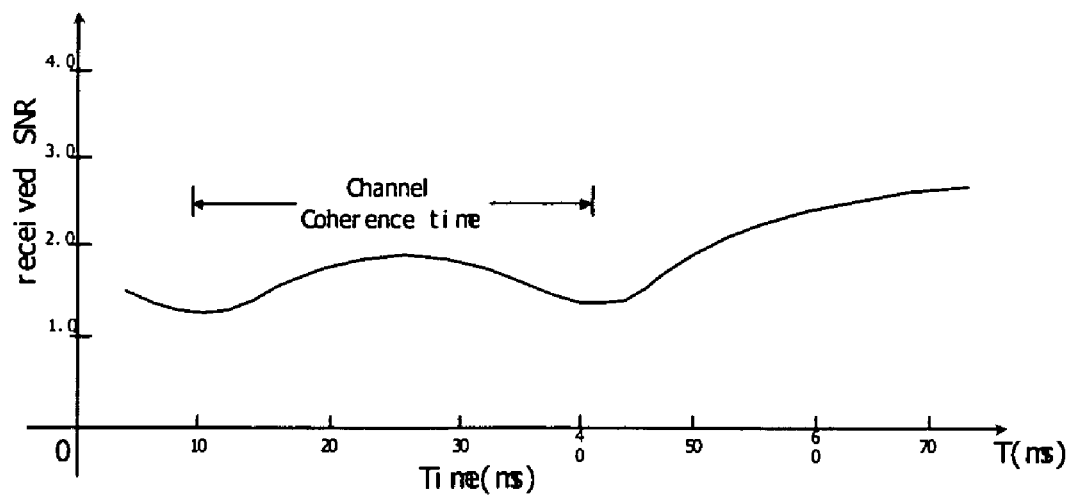
FIG. 4 is a diagram showing a SNR envelope within a relatively short time window.

5) During operating simulation where β0 is set as β0=β0+Δβ or β0=β0−Δβ in the foregoing step, the parameter β0 that makes the BER closest to the target BER being the object;

Then determining βk (the threshold value for changing MCS), that is, selecting an appropriate value β among an interval ($\beta_{down}$, β0) to make the throughput closest to the target throughput; here, βk represents the indicator of significant-increasing bit error that the system is likely to suffer;

6) In the initial phase, setting βk as $$\beta k = \frac{\beta_{down} + \beta_0}{2},$$

starting from the transmission of data of a second frame, obtaining a corresponding modulation and coding scheme (MCS) (as shown in FIG. 1) in accordance with the average value $\gamma_v$ obtained in step 3), for example, obtaining the corresponding modulation and coding scheme (MCS) M2 when $\gamma_1 < \gamma_v < \gamma_2$; comparing the set βk with $\beta_v$ in step 3), if $\beta_v > \beta k$, adopting the modulation and coding scheme M1 which is one level lower than the corresponding modulation and coding scheme M2, if $0 < \beta_v <= \beta k$, adopting the corresponding modulation and coding scheme M2 unchanged; calling the set βk and the simulation parameters of the adopted MCS, operating simulation, and obtaining the throughput of the system; If the obtained throughput being smaller than the target throughput, then setting βk as βk=βk+Δβ and calling the set βk and the simulation parameters of the adopted MCS, and operating simulation; If the obtained throughput being larger than the target throughput, then setting βk as βk=βk−Δβ and calling the set βk and the simulation parameters of the adopted MCS until the throughput being close to the target throughput. Here, the throughput meaning the number of bits correctly received in unit time; for example, the target throughput being equal to from several million to dozens of million bits.

Here, βk may be set from $\beta_{down}$ to $\beta_{up}$ respectively to operate simulation.

7) During operating simulation where βk is set as βk=βk+Δβ or βk=βk−Δβ in the foregoing step, the parameter βk that makes throughout closest to the target throughout being the object.

d) The comparison-update means 25 compares β with β0. If β>β0, then updates the current adaptation time window, e.g. $T_1$=20 ms, to be the adaptation time window that is one level lower, e.g. $T_2$=2 ms, and returns to step b), compares with β obtained in step b) with β0, implements repeatedly until β<=β0, and obtains the final current adaptation time window. Otherwise, obtains the current modulation and coding scheme such as $M_n$ in accordance with the decision criterion in accordance with the average value γ of the current SNR; and compares β with βk, if βk<β<β0, then updates the current modulation and coding scheme to be the modulation and coding scheme such as $M_{n-1}$ that is one level lower, otherwise, keeps the current modulation and coding scheme $M_n$ unchanged.

The current adaptation time window and the current MCS are fed back to the control means 14 of the base station 10 by the comparison-update means 25 via radio transmission of the mobile station, and transferred to the programmable adaptive modulation and coding means 13 of the base station 10 and the control means 23 of the mobile station 20 via the control means 14 of the base station 10. Then, the programmable adaptive modulation and coding means 13 performs modulation and coding on data from the data source 11 in accordance with the parameters from the control means 14, while the programmable demodulation and decoding means 22 of mobile station 20 performs demodulation and decoding on data from the base station 10 in accordance with the parameters from the control means 23.

As many apparently widely different embodiments of the present invention can be made without departing from the spirit and scope thereof, it is to be understood that the inven-

What is claimed is:

1. A method for adaptive modulation and coding based on second order statistics of channel information in orthogonal frequency divisional multiplexing (OFDM) systems, said method comprises following steps:
   a) a mobile station determining the largest among a set of adaptation time windows T1, T2, ... Tn as a current adaptation time window;
   b) said mobile station receiving a set of pilot signals from a base station in the current adaptation time window, obtaining Signal-to-Noise ratio (SNR) samples based on the set of pilot signals, calculating variance β of the SNR and average value γ of the SNR;
   c) comparing said variance β of SNR in step b) with threshold values β0, βk, obtaining a final current adaptation time window and a current modulation and coding scheme according to the results from comparison and said average value γ of SNR;
   d) feeding the final current adaptation time window and the current modulation and coding scheme, which are obtained in step c), back to the base station as parameters for the base station to transmit data next time.

2. A method for adaptive modulation and coding as claimed in claim 1, characterized in that, said step c) comprises the steps of:
   e) comparing β with β0, if β>β0, then updating the current adaptation time window in step b) to a lower level and returning to step b), otherwise implementing step f);
   f) obtaining a current modulation and coding scheme in accordance with the average value γ of SNR obtained in step b);
   g) comparing β with βk, if βk<β<β0, then updating the current modulation and coding scheme to a lower level, otherwise keeping the current modulation and coding scheme unchanged.

3. A method for adaptive modulation and coding as claimed in claim 1, characterized in that, in step a) a set of adaptation time windows T1, T2, ... Tn corresponding to various moving velocities v1, v2, ... vn of the mobile station respectively is obtained by pre-simulating and calculating channel coherence time, said channel coherence time meaning a period of time in which the correlation of two received signals is larger than 0.9.

4. A method for adaptive modulation and coding as claimed in claim 1, characterized in that, in step c) the threshold values β0 and βk are obtained in combination with simulation test where a target bit error rate and target throughput are approached, β0 being the threshold value for changing adaptation time window, βk being the threshold value for changing modulation and coding scheme, and β0>βk, and said target bit error rate and target throughout being determined by wireless communications service.

5. A method for adaptive modulation and coding as claimed in claim 1, characterized in that, in step b) the pilot signal is known data from the base station.

6. A device for adaptive modulation and coding based on second order statistics of channel information in orthogonal frequency divisional multiplexing (OFDM) systems, said device comprising calculation means and comparison-update means which are located in a mobile station, wherein:
   a channel estimation means of the mobile station for obtaining a sample of Signal-to-Noise Ratio (SNR) in accordance with pilot signals received from a base station by the mobile station, wherein current adaptation time window is the largest among a set of adaptation time windows T1, T2, ... Tn;
   the calculation means for calculating variance of the SNR β and average value of the SNR γ in accordance with the SNR samples obtained by said channel estimation means; and
   the comparison-update means for comparing the calculated variance β of the SNR with threshold values β0, βk, then obtaining a final current adaptation time window and a current modulation and coding scheme according to results from comparison and the average value of SNR γ obtained from the calculation means, said final current adaptation time window and the current modulation and coding scheme is fed back to said base station as parameters for said base station to transmit data next time.

7. A device as claimed in claim 6, wherein a set of adaptation time windows T1, T2, ... Tn corresponding to various moving velocities v1, v2, ... vn of the mobile station respectively is obtained by pre-simulating and calculating channel coherence time, said channel coherence time meaning a period of time in which the correlation coefficient of two received signals is larger than 0.9.

8. A device as claimed in claim 6, characterized in that, said pilot signal is known data from the base station.

9. A device as claimed in claim 6, characterized in that, the threshold values β0 and βk are obtained in combination with simulation test where a target bit error rate and target throughput are approached, β0 being the threshold value for changing adaptation time window, βk being the threshold value for changing modulation and coding scheme, and β0>βk, and said target bit error rate and target throughout being determined by wireless communications service.

10. A device as claimed in claim 6, wherein the comparison-update means comparing the calculated variance of SNR β with the threshold values β0, βk and then obtaining the final current adaptation time window and the current modulation and coding scheme according to results from comparison result and the average value of SNR γ, wherein the comparison-update means performs:
   (a) comparing β obtained by the calculation means with β0, and if β>β0, then
   (b) updating the current adaptation time window to a lower level;
   (c) obtaining Signal-to-Noise Ratio (SNR) samples from the channel estimation means in accordance with the current adaptation time window;
   (d) obtaining variance of the SNR β and average value of the SNR γ from the calculation means in accordance with the SNR samples;
   (e) repeating steps (a)-(d) until β<=β0, then obtaining final current adaptation time window;
   (f) obtaining the current modulation and coding scheme in accordance with the current average value of the SNR γ;
   (g) comparing β with βk, if βk<β<β0, then updating the current modulation and coding scheme to a lower level, otherwise keeping the current modulation and coding scheme unchanged.

* * * * *